UNITED STATES PATENT OFFICE.

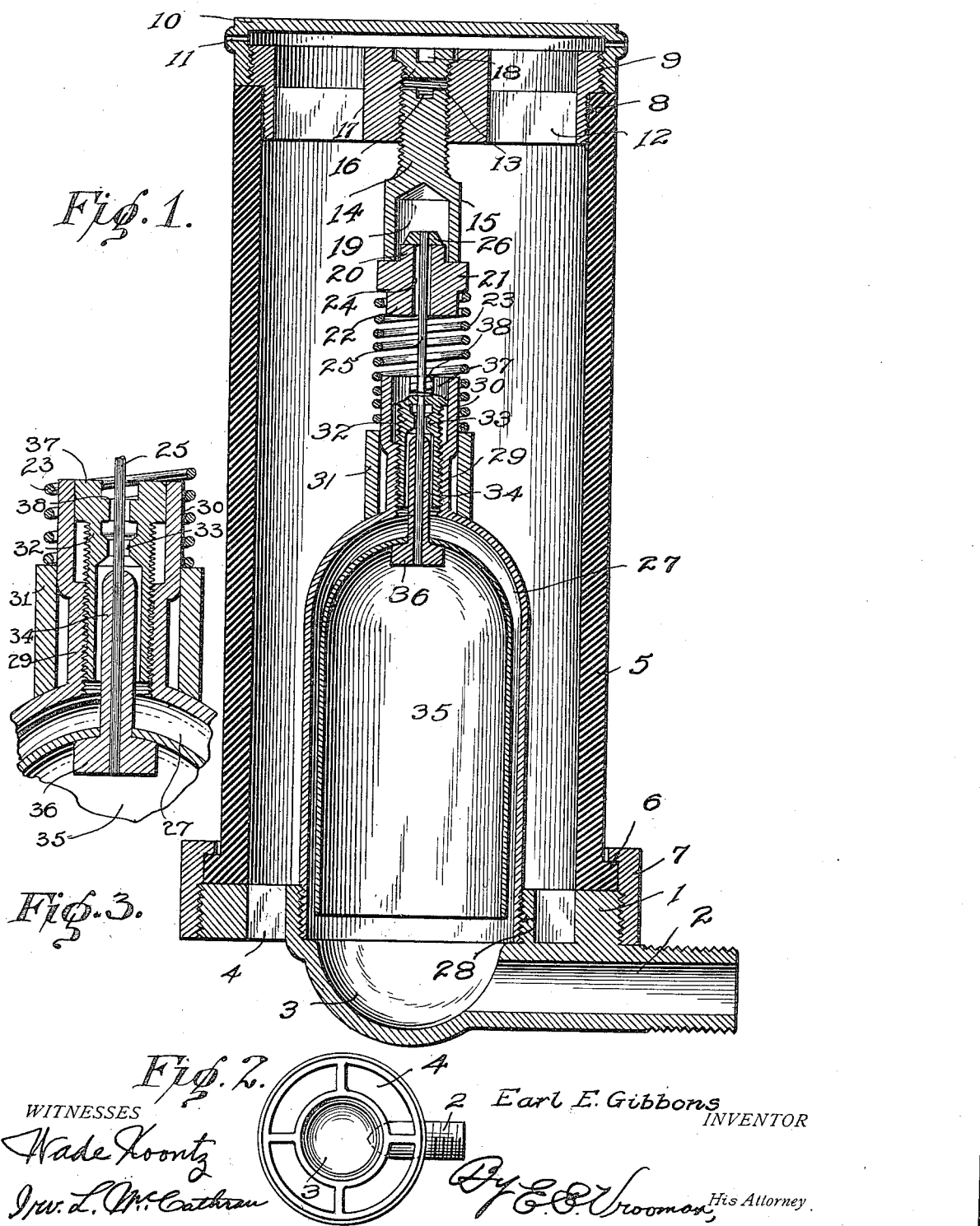

EARL E. GIBBONS, OF HOOPESTON, ILLINOIS.

VALVE FOR RADIATORS.

1,075,780. Specification of Letters Patent. Patented Oct. 14, 1913.

Application filed June 17, 1912. Serial No. 704,188.

*To all whom it may concern:*

Be it known that I, EARL E. GIBBONS, a citizen of the United States, residing at Hoopeston, in the county of Vermilion and State of Illinois, have invented certain new and useful Improvements in Valves for Radiators, of which the following is a specification, reference being had therein to the accompanying drawing.

This invention relates to valves and has particular reference to an automatic air valve which will allow the escape of compressed air from a radiator and will automatically close as soon as all the air has been removed from the radiator to prevent the escape of steam or hot water therefrom.

The principal object of this invention is the production of a simple and efficient valve which is provided with a casing capable of expanding to a considerable extent for preventing the passage of water or steam through the valve after the casing has expanded a certain amount.

Another object of this invention is the production of a simple and efficient valve mechanism which will effectually operate to cause the opening and closing of the valve under the expansion and contraction of the casing of the valve.

With these and other objects in view this invention consists of certain novel constructions, combinations, and arrangements of parts, as will be hereinafter fully described and claimed.

In the drawings:—Figure 1 is a central vertical section of the valve casing. Fig. 2 is a top plan view of the base of the casing. Fig. 3 is an enlarged sectional view showing the construction of the valve stem and shell adapted to coöperate with the valve for closing the same.

By referring to the drawing by numerals, it will be seen that 1 designates the base which is provided with a connecting nozzle 2 adapted to be threaded in the ordinary radiator. A bowl portion 3 is formed upon the base 1 so as to constitute a pocket for receiving the liquid from the float valve. The base 1 is provided with a plurality of apertures 4 for facilitating the admission of air into the casing, thereby preventing the congestion of air and steam within the casing, and consequent deterioration of the casing.

A casing or housing 5 is carried by the base 1 and provided upon its lower end with a laterally extending circular flange 6, which flange is gripped by means of a retaining collar 7, which retaining collar is threaded upon the base 1 as indicated in Fig. 1. The casing or housing 5 consists of an elongated tubular body made of hard rubber, carbon or other composition or compound, which will have considerable expansion under changes of temperature.

A spider 8 is externally threaded and is carried by and firmly engages the upper end of the housing or casing 5, and this spider is provided with an externally threaded portion 9 upon which is threaded a cap 10. This cap 10 is provided upon its sides with a plurality of apertures 11 for facilitating the escape of air or gas contained within the casing or housing 5, and allow a complete circulation of air through the casing. The spider 8 is provided with a plurality of apertures 12 for allowing the free passage of air through the spider 8, so as to be discharged through the apertures 11.

The spider 8 is provided with a central threaded aperture 13 in which is threaded the reduced threaded end 14 of the adjusting screw 15. The upper end of the adjusting screw 15 is provided with a socket 16 for allowing the insertion of a wrench or other device for adjusting the screw in the threaded socket 13. A cap 17 is threaded in the upper ends of the aperture 13, and is provided with a socket 18 for facilitating the rotation or threading of the cap 17 within the socket 13. The adjusting screw 15 is provided with a socket 19 formed in its lower end, and the reduced end 20 of the head 21 fits within the socket 19. This head 21 is provided upon its lower end with a reduced neck portion 22 for receiving the supporting coil spring 23. A central aperture 24 is formed in the head 21, and through this aperture passes the vertically extending valve operating rod 25. A head 26 is formed upon the upper end of the valve operating rod 25, and limits the sliding movement of the valve operating rod 25 in a downward direction. The head 26 normally rests upon the upper end of the head 22 when the valve is in an open position.

A shell or jacket 27 has its lower end threaded into the threaded aperture 28 of the base 1, and this jacket or shell 27 is provided with a reduced neck 29 which terminates in a spring guiding casing 30. A spring supporting collar 31 is carried by the jacket or shell 27, and surrounds the neck 29, and upon the upper end of the collar 31 the coil spring 27 rests. A valve seat 32 is threaded within the neck 29, and is provided with a reduced aperture 33, which acts as a guide for the valve operating rod 25. A valve closing sleeve 34 is carried by the lower end of the operating rod 25, and is of an elongated cylindrical formation having a rounded upper end and adapted to close the passage through the reduced aperture 33, as the valve closing sleeve 34 is moved upwardly. A float 35 is carried by the valve closing sleeve 34, and is held thereon by means of the enlarged head 36.

The valve seat 32 is provided with an enlarged head 37 which is provided with a transversely extending notch 38 for facilitating the threading of the valve seat 32 into its position.

When any water enters the jacket, the water will engage the float and carry the same upward, allowing the sleeve 34 to close the aperture 33. At the same time the rod 25 will have freedom of action through the head 22 and raises the head 26 from the head 22. The head 22 is held down on the coil spring 23, while the expansible casing is in its contracted condition. The float merely rises when any water which might enter the jacket engages the float, and as soon as the water is relieved from the float, the float will immediately drop back again to its normal position. This head 22 can only rise when any perceptible heat reaches the casing 5, causing the casing to expand.

The steam from the radiator will enter through the connecting nozzle 2 and pass up between the walls of the outer jacket 27 and the float 35 and will then pass through the valve seat 32 and through the reduced aperture 33. The steam will then pass out into the casing or housing 5 and by allowing the steam to pass out into the casing 5, the casing 5 will expand and when this casing expands the adjusting screw 15 will be moved upwardly with the upper end of the casing 5, and the spring 23 will force the head 21 upwardly, thereby moving the operating rod 25 upwardly and drawing the sleeve 34 upwardly and forcing the same tightly upon the valve seat 32, thereby closing the passage through the aperture 33 and preventing the further escape of steam. It, of course, should be understood that when the radiator cools and the casing 5 contracts the spring 23 will be again compressed and the enlarged head 36 will drop to its normal position carrying the float 35 downwardly and again opening the passage through the aperture 33.

By carefully considering the above description in connection with the drawing, it will be seen that the valve as set forth will allow the cold air to escape from a steam radiator, and as soon as the air has been removed from the radiator the valve will automatically shut off so as to prevent the escape of steam or hot water therefrom. It will be seen that as soon as the steam begins to pass through the valve, the heat will cause the outer casing to expand and thereby automatically shut off the passage of air or steam through the valve seat 32.

It should be understood that the apertures 4 allow a free circulation of air from the outside of the casing 5 so as to prevent the stream or air from being congested within the casing 5 which would cause the deterioration of the casing. By means of having the apertures 4, it should be understood that the air escaping from the valve may readily pass out from the apertures 4, and at the time the valve is closed the air from the outside of the casing may circulate through the casing so as to keep the temperature down as low as possible at the time the valve is closed. By having these ventilating apertures formed in the bottom of the device a free circulation of air may be obtained through the casing.

What is claimed is:—

1. A valve of the class described comprising a base, an expansible casing carried by said base, a jacket carried by said base, said jacket provided with an upwardly extending neck, a valve seat carried by said neck, a cap carried by said casing, an adjusting screw carried by said cap, a vertically movable head engaging said adjusting screw a spring supporting said head and holding the same in engagement with said adjusting screw, a float carried within said jacket, a valve stem passing through said valve seat and engaging said float, means carried by said valve stem for closing the passage through said valve seat, and a head carried by the upper end of said valve stem for engaging said first named head and thereby causing said float to be raised as said casing expands.

2. A valve of the class described comprising a base, an expansible casing carried by said base, a cap carried by said expansible casing, a jacket carried by said base, an adjusting screw carried by said cap, a head yieldably supported upon said jacket and engaging said adjusting screw, and a valve engaging said head, a valve seat carried by said jacket for receiving said valve and thereby closing the passage through said valve seat as said casing expands.

In testimony whereof I hereunto affix my signature in presence of two witnesses.

EARL E. GIBBONS.

Witnesses:
 JAMES GIBBONS,
 MARK R. KOKLIN.